United States Patent Office 2,765,049
Patented Oct. 2, 1956

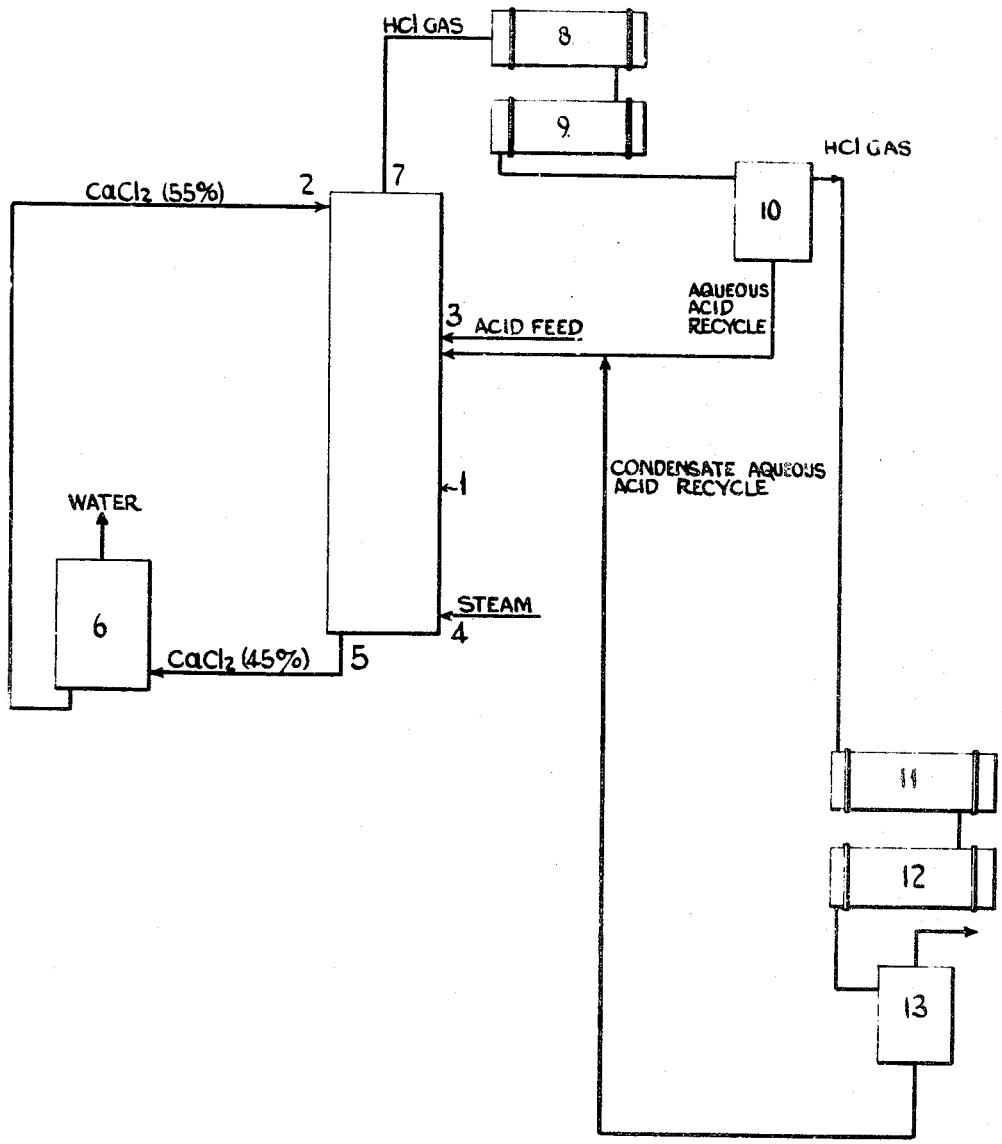

2,765,049
PRODUCTION OF HCl

George A. Nafziger, New Martinsville, W. Va., assignor to Columbia-Southern Chemical Corporation, Allegheny County, Pa., a corporation of Delaware Application February 1, 1954, Serial No. 407,300

7 Claims. (Cl. 183—120)

The instant invention pertains to an improved method for producing gaseous hydrogen chloride, notably substantially anhydrous hydrogen chloride, from aqueous solutions of hydrogen chloride. It is particularly concerned with a simple and efficient method of recovering essentially anhydrous hydrogen chloride from hydrochloric acid by treatment with hot, concentrated aqueous solutions of a hygroscopic salt, such as calcium chloride.

In accordance with the instant invention, substantially anhydrous hydrogen chloride is recovered from hydrochloric acid by introducing a hot solid-free concentrated aqueous solution of a hygroscopic salt, notably calcium chloride, into the upper portion of a suitably packed hot zone, feeding an aqueous solution of hydrogen chloride into an intermediate portion of the zone below the point of salt solution introduction, withdrawing from the lower portion of the zone an aqueous solution of the salt which is cooler and of lower salt concentration than the salt solution introduced to the zone and removing gaseous hydrogen chloride from the upper section of the zone. The zone is typically operated at slightly above atmospheric pressure, e. g. up to 10 p. s. i. g., although higher and lower pressures including slight vacuum may be utilized providing adequate materials of construction are provided.

A preferred embodiment of this invention involves introducing a hot, concentrated aqueous solution of calcium chloride into the upper portion of a vertically disposed, packed, hot zone, said solution and zone being at a temperature of from 120° C. to 140° C., notably at approximately or just below the normal boiling temperature of the solution, the solution containing between 30 and 60, more desirably between 45 and 55 percent calcium chloride by weight, feeding an aqueous solution of hydrogen chloride to an intermediate portion of the zone below the point of calcium chloride introduction, withdrawing an aqueous calcium chloride solution from the lower portion of the zone, said withdrawn solution containing a lower concentration of calcium chloride than the introduced solution and being at a temperature of from 110 to 130° C. and cooler than the introduced solution, notably about 10° C. cooler, and removing gaseous hydrogen chloride from the upper section of the zone. The temperature of the zone at the point of acid introduction is below the zone's temperature at either end, and is normally between about 90° C. and 105° C.

Some water vapor may be present in the vapors of hydrogen chloride as they leave the packed zone, the exact amount varying with different operating conditions. In the event such water constitutes an undesirable quantity, or if perfectly dry hydrogen chloride is required, water is removed by selective condensation. Thus, these emanating gases are cooled, e. g. to between minus 20° C. and plus 50° C.; and the resulting aqueous condensate contains essentially all of the water present in the gases prior to the condensation, leaving anhydrous gaseous hydrogen chloride.

A further contemplated step includes separating the condensate from the remaining gaseous hydrogen chloride and reintroducing it into the packed zone to be further treated. Accordingly, the condensate may be combined with the aqueous hydrogen chloride feed to the treating zone or it may be added independently. Even when introduced as a separate stream, it is fed at an intermediate section of the zone approximating the level at which the untreated aqueous hydrogen chloride is added.

As it is withdrawn, the aqueous calcium chloride solution has a salt concentration below that of the solution which is introduced into the upper section of the zone. In a typical operation, dilution of the feed calcium chloride takes place to the extent that the respective concentrations of calcium chloride in the feed and withdrawn solutions differ in the percent calcium chloride present therein by about 10. With a feed concentration of 55 percent calcium chloride by weight, the calcium chloride concentration in the removed solution is about 45 percent by weight.

It is also preferred to withdraw the calcium chloride solution at a temperature between 110° C. and 130° C., but below the temperature of the introduced solution. In this regard, the temperature of the removed solution is between 10 and 20° C. below the introduction temperature.

Efficient and economical performance of the process normally further involves utilizing the diluted calcium chloride by concentrating it until it may be reintroduced as feed to the zone. This may be accomplished by evaporation of the water, for example, by indirectly heating the dilute solution and removing the water vapors thus generated. A preferred expedient utilizes submerged combustion wherein a combustible gas, or gaseous mixture is ignited below the liquid level of the liquid being treated, but insulated therefrom, and passing the resulting hot gases through the liquid.

Steam, preferably at superatmospheric pressure, may be added to the packed zone at its lower extremity. The steam serves a plurality of purposes including the maintenance of a suitable temperature in the bottom of the zone and the stripping of hydrogen chloride from the diluted calcuim chloride solution. In lieu of steam injection, a portion of the withdrawn calcium chloride solution may be vaporized, as by reboiler operation, and returned to the bottom of the zone.

Aqueous solutions of hydrogen chloride of varying concentrations may be employed as the source of hydrogen chloride. Solutions which contain from 20 percent to 45 percent by weight of hydrogen chloride are usually employed, although the process may be used to concentrate more or less diluted hydrochloric acid.

As employed herein a packed zone refers to a confined area, such as a tower, which is filled with suitable inert materials, which materials are of such dimensions that they provide an increased contact area for the liquid and gas phases within the area. Typical packings are Berl saddles, Raschig rings and similar inert refractory materials.

The following examples demonstrate the manner in which the invention may be practiced.

Example I

Referring to the accompanying drawing, tower 1 28 feet high and 6 feet in diameter is packed with 1½ inch Raschig rings. Into the top of tower 1 at 2, 124,600 pounds per hour of aqueous calcium chloride at 138° C. and containing 55 percent calcium chloride by weight is introduced. Intermediate the vertical extremities of tower 1 at 3 (approximately 8 feet from the top of tower 1), 26,600 pounds per hour of aqueous hydrogen chloride solution containing 32 percent hydrogen by weight is introduced. Steam (9440 pounds per hour) at 15 pounds per square inch gauge is injected at 4.

Leaving the bottom of the tower at 5, is an aqueous calcium chloride solution containing 45 percent calcium chloride by weight. On an hourly basis, this solution contains 68,800 pounds of calcium chloride and is at a temperature of 121° C. when it is withdrawn. After leaving the tower the solution is concentrated by heating in submerged combustion chamber 6, some 27,200 pounds of water being evaporated. The thusly concentrated solution is recycled to the tower as 55 percent calcium chloride concentrate.

Hydrogen chloride gas at 138° C. issues from the top of tower 1 at 7 and is cooled stepwise to about 35° C. in heat exchangers 8 and 9 by bringing the gases into heat exchange relationship with cooling water. Water at 29.5° C. is flowed countercurrent to the flow of gases through heat exchangers 8 and 9 at the rate of 26.3 gallons per minute; the gases leave 8 at a temperature of about 57° C.

From heat exchanger 9, the cooled materials are passed into a water-gas separator 10 and the separated condensate is returned to tower 1 at a point about 8 feet from the top thereof. By virtue of this separation, 213 pounds per hour of hydrogen chloride and 409 pounds of water per hour are recycled. This leaves a gas which contains 8364 pounds of hydrogen chloride and 31 pounds of water (per hour).

Additional water is removed with further cooling of the gas stream to minus 17° C. by passing it through brine-cooled heat exchanges 11 and 12 and removing the condensate in separator 13. In separator 13, approximately 31 pounds per hour of hydrogen chloride and 31 pounds of water per hour are removed as an aqueous solution; this condensate in turn, is added to the condensate collected from separator 10 and returned to tower 1. The remaining gas stream flows at the rate of 8333 pounds of hydrogen chloride per hour and contains less than 30 parts per million of water by weight.

*Example II*

Employing essentially the same procedure and apparatus as described in Example I, 8333 of hydrogen chloride per hour containing below 30 parts per million of water by weight is prepared when aqueous hydrogen chloride containing 21 percent hydrogen chloride is fed to the tower when the following feed rates (per hour) are used:

|  | Pounds |
|---|---|
| Aqueous calcium chloride (55 percent CaCl₂) | 219,210 |
| Aqueous hydrogen chloride (21 percent HCl) | 40,470 |
| Steam | 16,734 |
| Aqueous calcium chloride removed (50 percent CaCl₂) | 240,744 |

*Example III*

If the apparatus and procedure is followed as described in Example II, except that 44.5 percent acid is fed to the system, 8333 pounds per hour of hydrogen chloride containing less than 30 parts per million by weight of water are obtained when the following feed rates per hour are used:

|  | Pounds |
|---|---|
| Aqueous calcium chloride (55 percent CaCl₂) | 71,800 |
| Aqueous hydrogen chloride (44.5 percent HCl) | 19,150 |
| Steam | 5,470 |
| Aqueous calcium chloride removed (45.2 percent CaCl₂) | 87,600 |

Aqueous solutions of hygroscopic salts other than the preferred calcium chloride are suitable. Several such hygroscopic salts include zinc chloride, magnesium chloride, calcium bromide, calcium iodide and ferric chloride; still others will be apparent to one skilled in the art.

Although the invention has been described with reference to specific details of certain embodiments of this invention, the invention is not intended to be construed as limited thereto except insofar as the details are included in the appended claims.

I claim:

1. A method of recovering substantially anhydrous hydrogen chloride from aqueous solutions thereof which comprises introducing a hot, solid-free concentrated aqueous solution of a hygroscopic salt into the upper portion of a vertically disposed, packed zone, said solution and zone at the point of introduction thereof being at a temperature of about the boiling temperature of the hygroscopic salt solution, feeding an aqueous solution of hydrogen chloride into an intermediate portion of the zone below the point of salt introduction, the temperature of the zone at the point of hydrogen chloride solution introduction being below the temperature at either end of the zone, withdrawing from the lower portion of the zone an aqueous solution of the hygroscopic salt, said withdrawn solution being at a lower temperature and containing a lower salt concentration than the salt feed solution and removing gaseous hydrogen chloride from the upper section of the zone.

2. A method of recovering substantially anhydrous hydrogen chloride from aqueous solutions thereof which comprises introducing a solid-free aqueous calcium chloride solution into the upper section of a vertically disposed, packed, hot zone, said solution containing between 30 and 60 percent calcium chloride by weight and being at a temperature of between 120° C. and 140° C., the zone at the point of aqueous calcium chloride introduction being at between 120° C. and 140° C., feeding an aqueous solution of hydrogen chloride to an intermediate section of the zone below the point of calcium chloride solution introduction, withdrawing an aqueous solution of calcium chloride from the lower portion of the zone beneath the point at which aqueous hydrogen chloride is fed, the withdrawn solution being less concentrated with calcium chloride and at a lower temperature than the calcium chloride feed solution and removing gaseous hydrogen chloride from the upper portion of the zone.

3. The method of claim 2 wherein the withdrawn calcium chloride solution is at a temperature between 110° C. and 130° C. but below the temperature of the calcium chloride solution fed to the zone.

4. The method of claim 2 wherein the removed gaseous hydrogen chloride is cooled to between minus 20° C. and plus 50° C. whereby any water vapor present is condensed and separating the condensate from the remaining gaseous hydrogen chloride.

5. The method of claim 4, which includes returning the condensate to the zone at a point which is essentially the same distance from the top of the zone as the feed point of the aqueous hydrogen chloride.

6. A method of recovering substantially anhydrous hydrogen chloride from aqueous solutions thereof which comprises introducing a solid-free aqueous calcium chloride solution at between 120° C. and 140° C. and containing from 30 to 60 percent calcium chloride by weight into the upper section of a packed, hot zone, said zone at the point of calcium chloride solution introduction being at 120° C. to 140° C., feeding an aqueous solution of hydrogen chloride containing from 20 to 45 percent hydrogen chloride by weight to an intermediate section of the zone below the point of calcium chloride solution introduction, the temperature of the zone at the point of aqueous hydrogen chloride feed being below the temperature at either end of the zone, withdrawing an aqueous solution of calcium chloride from the lower portion of the zone below the point at which aqueous hydrogen chloride is fed, the withdrawn solution being less concentrated with calcium chloride than the calcium chloride feed solution and at a temperature of from 110° C. to 130° C., but between 10° C. and 20° C. cooler than the temperature of the calcium chloride feed solution, and removing gaseous hydrogen chloride from the upper portion of the zone.

7. A method of recovering substantially anhydrous hydrogen chloride from an aqueous solution thereof which comprises introducing a solid-free aqueous calcium chloride solution at between 120° C. and 140° C. containing from 30 to 60 percent calcium chloride by weight into the upper section of a packed, hot zone, said zone at the point of calcium chloride introduction being at 120° C. to 140° C., feeding an aqueous solution of hydrogen chloride containing from 20 to 45 percent hydrogen chloride by weight to an intermediate section of the zone below the point of calcium chloride solution introduction, the zone at the point of hydrogen chloride introduction being between 90° C. and 105° C., withdrawing an aqueous solution of calcium chloride from the lower portion of the zone below the point at which aqueous hydrogen chloride is fed, the withdrawn solution being less concentrated with calcium chloride than the calcium chloride feed solution and at a temperature of 110° C. and 130° C., but between 10° C. and 20° C. cooler than the temperature of calcium chloride feed solution and removing gaseous hydrogen chloride from the upper portion of the zone.

References Cited in the file of this patent

UNITED STATES PATENTS

| | | |
|---|---|---|
| 2,321,282 | Comstock | June 8, 1943 |
| 2,351,461 | Smith et al. | June 13, 1944 |
| 2,357,095 | Evans | Aug. 29, 1944 |
| 2,367,301 | Mohr | Jan. 16, 1945 |
| 2,437,290 | Bottenberg et al. | Mar. 9, 1948 |

FOREIGN PATENTS

| | | |
|---|---|---|
| 669,671 | Great Britain | Apr. 9, 1952 |